Nov. 27, 1934.  C. W. BECKER  1,981,942
TELEVISION RECEIVING APPARATUS
Filed April 18, 1931   2 Sheets-Sheet 1

Inventor.
Carl W. Becker

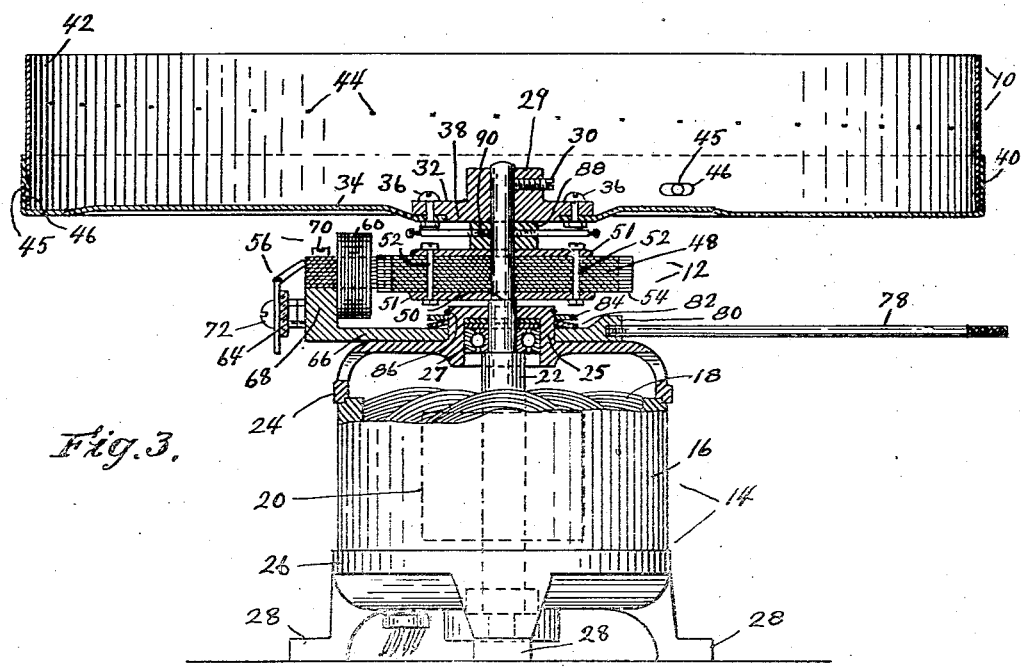
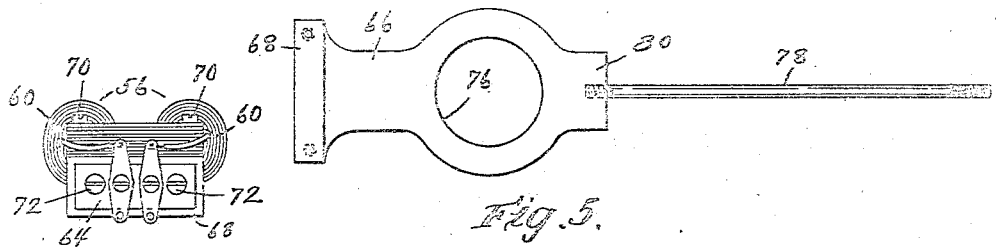

Patented Nov. 27, 1934

1,981,942

UNITED STATES PATENT OFFICE 1,981,942

TELEVISION RECEIVING APPARATUS

Carl W. Becker, Allston, Mass.

Application April 18, 1931, Serial No. 531,121

7 Claims. (Cl. 178—69.5)

This invention relates to television receiving apparatus and particularly to scanning devices and driving mechanism therefor and is intended as an improvement on the apparatus disclosed in a concurrently filed application of Hollis S. Baird, Serial No. 531,114, which is assigned to the assignee of the present application.

One of the objects of the present invention is to provide a scanning device with a non-synchronous and, preferably, variable speed driving motor therefor which will drive the scanning device at approximately synchronous speed, combined with a synchronous driving motor which maintains the scanning device in synchronism with the incoming television signals, there being a resilient and yielding driving connection preferably between the rotor of the synchronous driving motor and the scanning device so as to prevent hunting of the scanning device and to maintain the scanning device in synchronism regardless of expected variations of input power to either motor.

A further object of the invention is the construction of the synchronous driving motor in such a manner that the field frame of the motor can be shifted angularly whereby to bring the composed televised picture into frame when it is out of frame.

A further object is generally to improve the construction and operation of television receiving apparatus.

Fig. 3 is a vertical sectional detail of the apparatus of Fig. 1.

Fig. 4 is an end view of the field magnet frame of the synchronous motor.

Fig. 5 is a detailed plan view of the magnet supporting frame for the field magnets of the synchronous motor.

Figure 1:
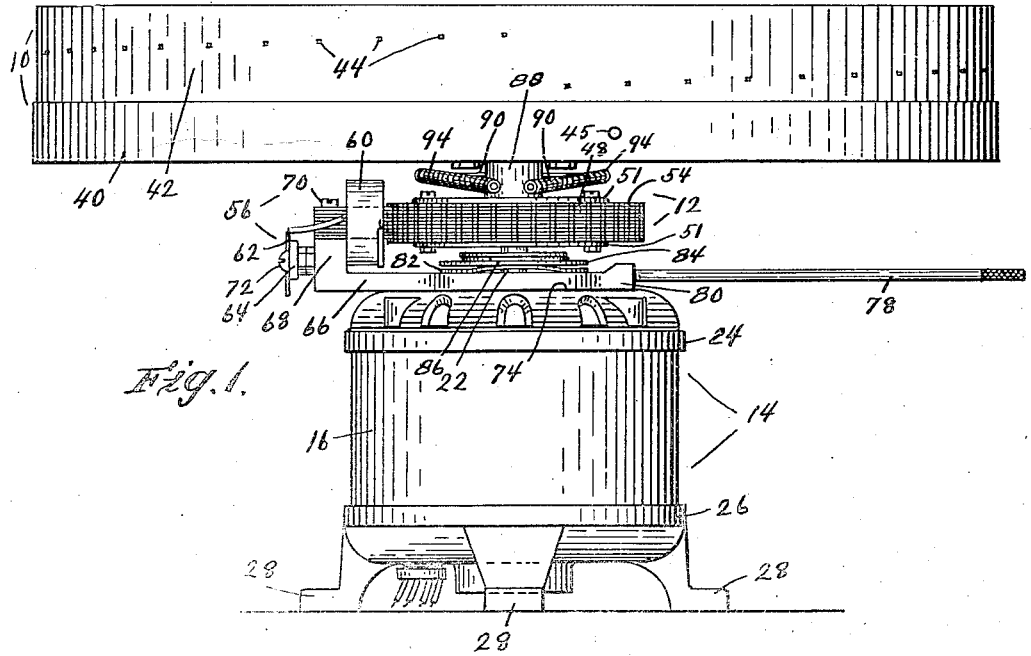
Fig. 1 is a side elevation of a television receiving apparatus embodying the present invention.
Figure 2:
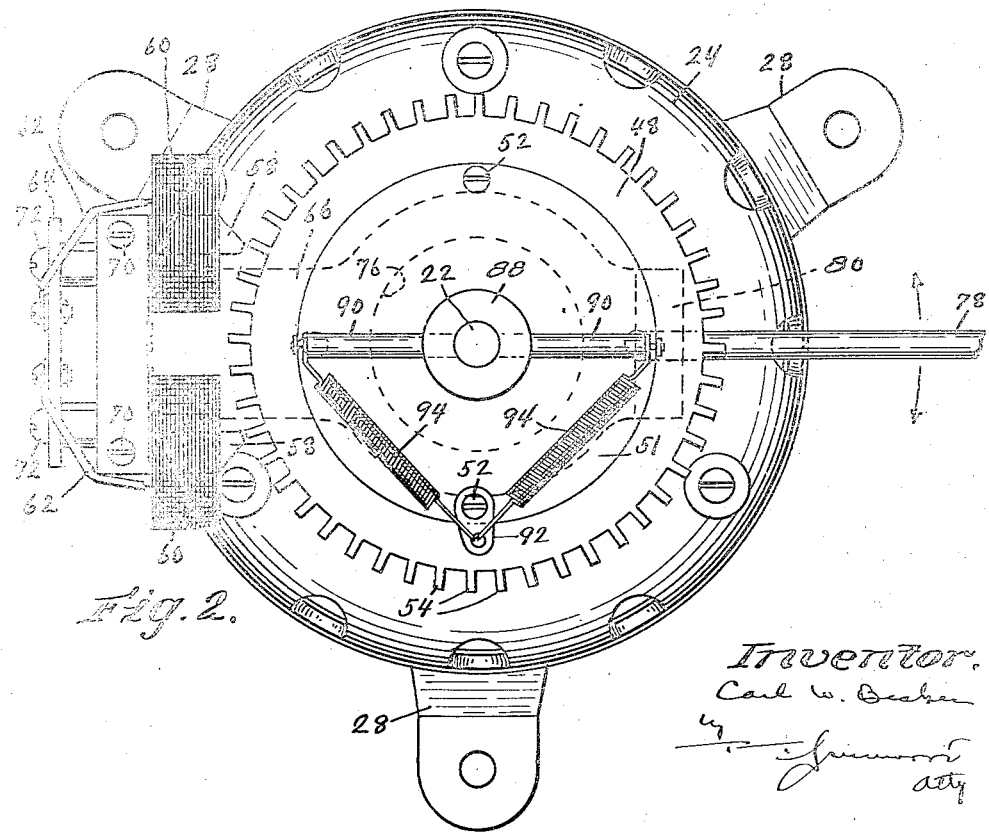
Fig. 2 is a plan view of the apparatus of Fig. 1 with the scanning drum removed.

As here shown, the television receiving apparatus comprising the present invention comprises a scanning drum 10, and a synchronous driving motor 12 and an asynchronous driving motor 14 therefor. The asynchronous driving motor 14 preferably is of the continuously-variable speed type and can be a single phase induction motor having the stator frame 16 with its field windings 18 and the armature or rotor 20 provided with a vertical driving shaft 22. The stator frame is provided with an upper cover plate or bell 24 and a similar lower cover plate or bell 26 which latter is provided with supporting feet 28. The shaft 22 is rotatable in bearings carried by said bells, the shaft being rotatable in a ball bearing 27 received in a recess in an upstanding cylindrical boss or neck 25 of the upper bell 24. The shaft 22 is extended vertically above said boss 25 and carries at its upper end the hub 29 of the scanning device 10, which hub is fixed removably to the shaft by the set screw 30. The hub has a radially outstanding flange 32 to the lower face of which is secured a radial disc 34, the disc being secured to the flange by bolts 36 and having an aperture in its center in which a shoulder 38 of the flange is located whereby to center the disc and the flange. The disc has an upturned peripheral portion 40 which surrounds an annular band or drum 42 that is provided with a spiral row of peripherally spaced scanning windows 44.

The driving motor 14 is adapted to drive the disc approximately at synchronous speed, its speed being suitably set manually by the manipulation of a rheostat, not shown, in series with the circuit of the motor. The scanning drum is maintained in synchronism with the incoming television signal by means of the synchronous motor 12. Said motor is located between the driving motor 14 and the scanning drum. The motor 12 includes a rotor or armature 48 that is mounted on and is concentric with the shaft 22 of the driving motor but is free for a certain amount of angular movement thereon and rests on a shoulder 50 of said shaft. Said rotor is composed of a stack of steel laminations which are clamped together between end plates 51 by the bolts 52. The rotor is provided with a plurality of peripherally spaced teeth 54, the number of teeth depending upon the number of scanning windows that are passed across the field of view per unit of time at the transmitting station, this number determining the fundamental synchronizing frequency. The rotor 48 is provided with a bipolar field magnet structure 56 comprising a generally U-shaped laminated magnetic core having opposed poles 58 which are terminated in close proximity to the rotor 48 and are spaced circumferentially apart to include between them a certain number of teeth 54 of the rotor, the pitch of the field poles being a certain multiple of the pitch of the teeth 54. The poles 58 are provided with energizing windings or coils 60, tne terminals 62 of which are brought out to a terminal board 64. The field core is supported by a supporting frame 66 which has at one end an upstanding projection 68 upon which the base of the field is supported and to which it is secured by means of screws 70. The terminal board 64 is also secured to the vertical face of said projection by screws 72. The supporting frame 66 is supported upon the flat top face 74 of the top bell 24 of the driving motor 14 and has a circular aperture 76 therein in which the cylindrical bearing boss 25 of the driving motor is snugly received so that the frame is supported concentrically with the driving shaft 22. The frame is rotatable on the boss 25 and bell 24 by means of the rod 78 which is screw-threaded into a lug 80 of the frame on the side opposite the field core. Thus the angular position of the field core can be shifted one way or the other to permit the framing of the constructed televised image. The frame is held frictionally in any set position on the hub 29 by means of a spring washer 82 which encircles the hub and bears against the upper face of the frame and also by means of a superimposed plain washer 84 and the spring retaining ring 86 which is located in an annular groove of the hub.

The rotor 48 of the synchronous motor is loose on the driving shaft 22 and has resilient and yielding driving connections therewith so as to prevent hunting. To this end the shaft 22 is provided with a collar 88 which is located between the hub 29 of the scanning drum and the rotor 48 and is secured thereto by a pair of diametrically opposed rods 90 which are screw-threaded into the hub and bear against the shaft and are extended diametrically in opposite directions over the rotor 48. The rotor 48 is provided with an apertured plate 92 which is secured thereto by one of the aforesaid screws 52 and is connected with the similar ends of a pair of tensile springs 94 which extend in opposite directions and have their other ends secured to the outer ends of the rods 90. The drive between the rotor 48 and the shaft 22 is thus transmitted through one or the other of said springs depending upon the direction of rotation of the rotor and said springs have sufficient resiliency so that the synchronous motor can maintain the scanning drum in synchronism with the incoming signal.

In practice the speed of the asynchronous motor 14 is set to be slightly in excess of synchronism so that the synchronous motor acts as a drag on the driving motor and holds it down to synchronous speed. If desired, however, the speed of the asynchronous motor can be something less than synchronism and the synchronous motor can make up for the difference in speed.

The present application is concerned with the angular adjustability of the field poles of the synchronous motor and the resilient connections between the rotor of the synchronous motor and the scanning device, the remaining features of the invention being described and claimed in the above identified application of Hollis S. Baird.

The television signal includes synchronizing pulses which are amplified and operate the synchronous motor as described in the above identified application of Hollis S. Baird.

I claim:

1. Television receiving apparatus comprising the combination of an asynchronous driving motor having a stationary field frame and a rotatable shaft, a scanning device fixed to said shaft, a synchronous driving motor having a rotor carried by and loose on said shaft, a stator carried by said field frame of said asynchronous driving motor, and driving springs connecting said rotor and shaft.

2. Television receiving apparatus comprising the combination of an asynchronous driving motor having a shaft, a scanning device fixed to said shaft, a synchronous driving motor having a rotor carried by and loose on said shaft, an arm fixed to and extended from said shaft, and a spring connecting said arm and rotor and constituting the driving connection between said shaft and rotor.

3. Television receiving apparatus comprising the combination of an asynchronous driving motor having a shaft, a scanning device fixed to said shaft, a synchronous driving motor having a rotor rotatably loose on said shaft, a collar fixed to said shaft having oppositely extended arms, and springs connected with said arms and to a part of said rotor normally between said arms, said springs and arms constituting the driving connection between said rotor and shaft.

4. Television receiving apparatus comprising the combination of an asynchronous driving motor having a shouldered shaft, a collar fixed to said shaft above the shoulder, a synchronous driving motor having a rotor rotatably loose on said shaft between the shoulder and said collar, said collar having oppositely-extended arms, springs connected between said arms and said rotor and constituting the driving connection between said rotor and shaft, and a scanning device fixed to said shaft above said collar.

5. Television receiving apparatus comprising the combination of a variable speed driving motor having a shaft, a scanning device fixed to said shaft, a synchronous driving motor having a rotor concentric with said shaft and located between said variable speed motor and said scanning device and having a resilient and yielding driving connection with said shaft, and a field frame which is carried by and is angularly adjustable on said variable speed driving motor concentrically with said shaft.

6. Television receiving apparatus comprising the combination of an asynchronous driving motor having a driving shaft, a stationary field frame having an end bell provided with a boss that is concentric with said shaft, a synchronous driving motor having a rotor on said shaft and a magnet structure that is supported on said end bell and surrounds and is rotatable on said boss, and a scanning device fixed to said shaft.

7. Television receiving apparatus comprising the combination of an asynchronous driving motor having a rotatable shaft, a stationary field frame having an end bell provided with a boss that is concentric with said shaft, a scanning device fixed to said shaft, and a synchronous driving motor having a rotor on said shaft between said fixed field frame and said scanning device, a magnet structure for said rotor, and a supporting frame for said magnet structure that is carried by said end bell and surrounds and is rotatable on said boss and has an extended handle on the side of said shaft opposite said field frame for angularly-adjusting the position of said field frame.

CARL W. BECKER.